Jan. 26, 1943.  C. A. BICKEL  2,309,299
METHOD OF AND APPARATUS FOR CORRECTING
THE LEAD ERROR OF SCREW THREADS
Filed Nov. 18, 1940  3 Sheets-Sheet 1
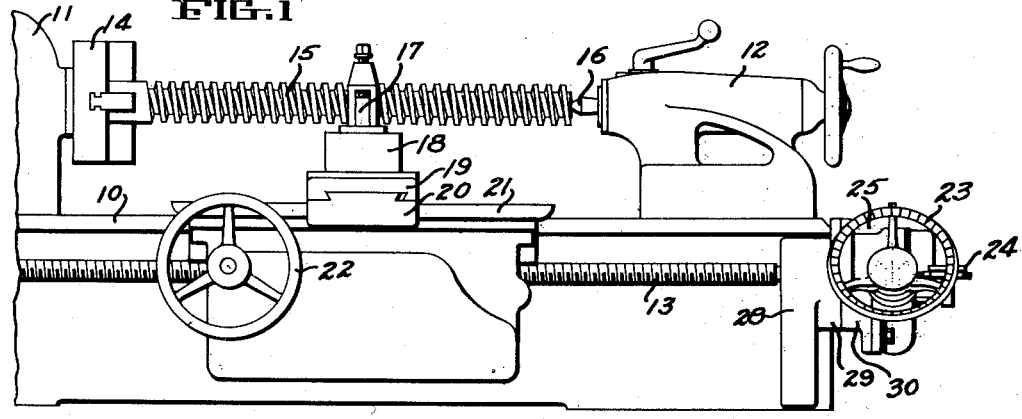
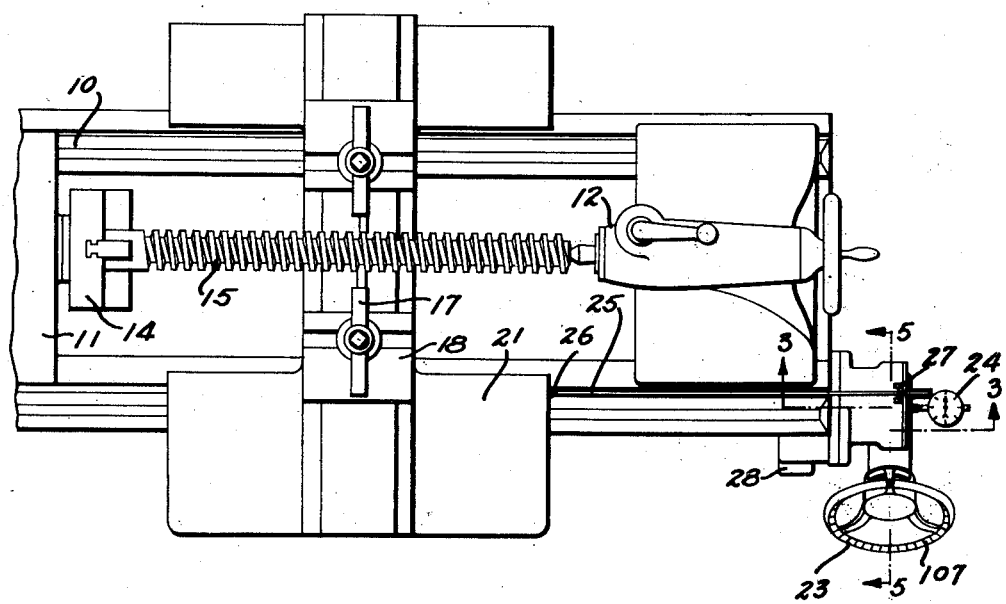
INVENTOR
CLIFFORD A. BICKEL
BY
ATTORNEYS

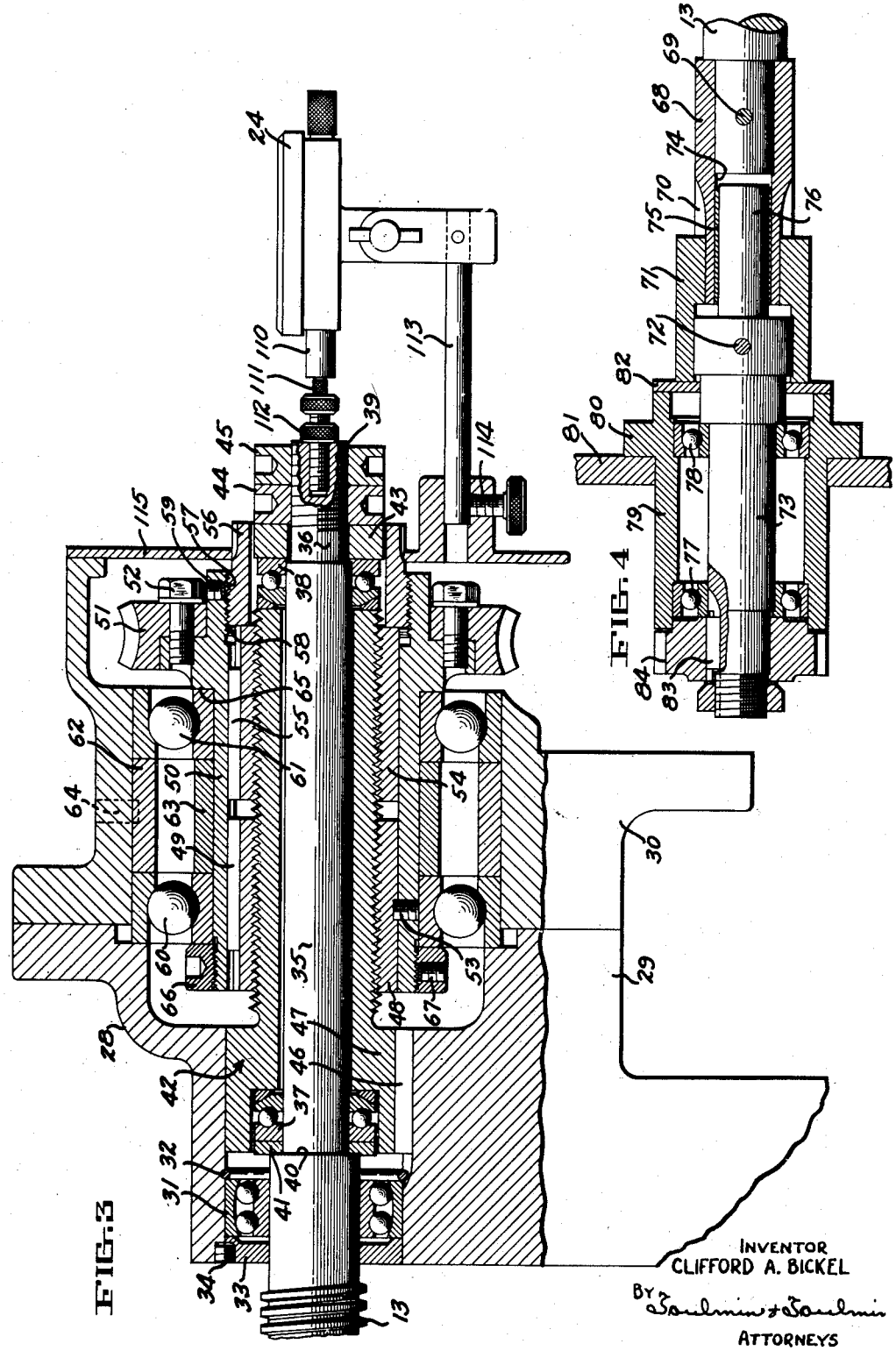

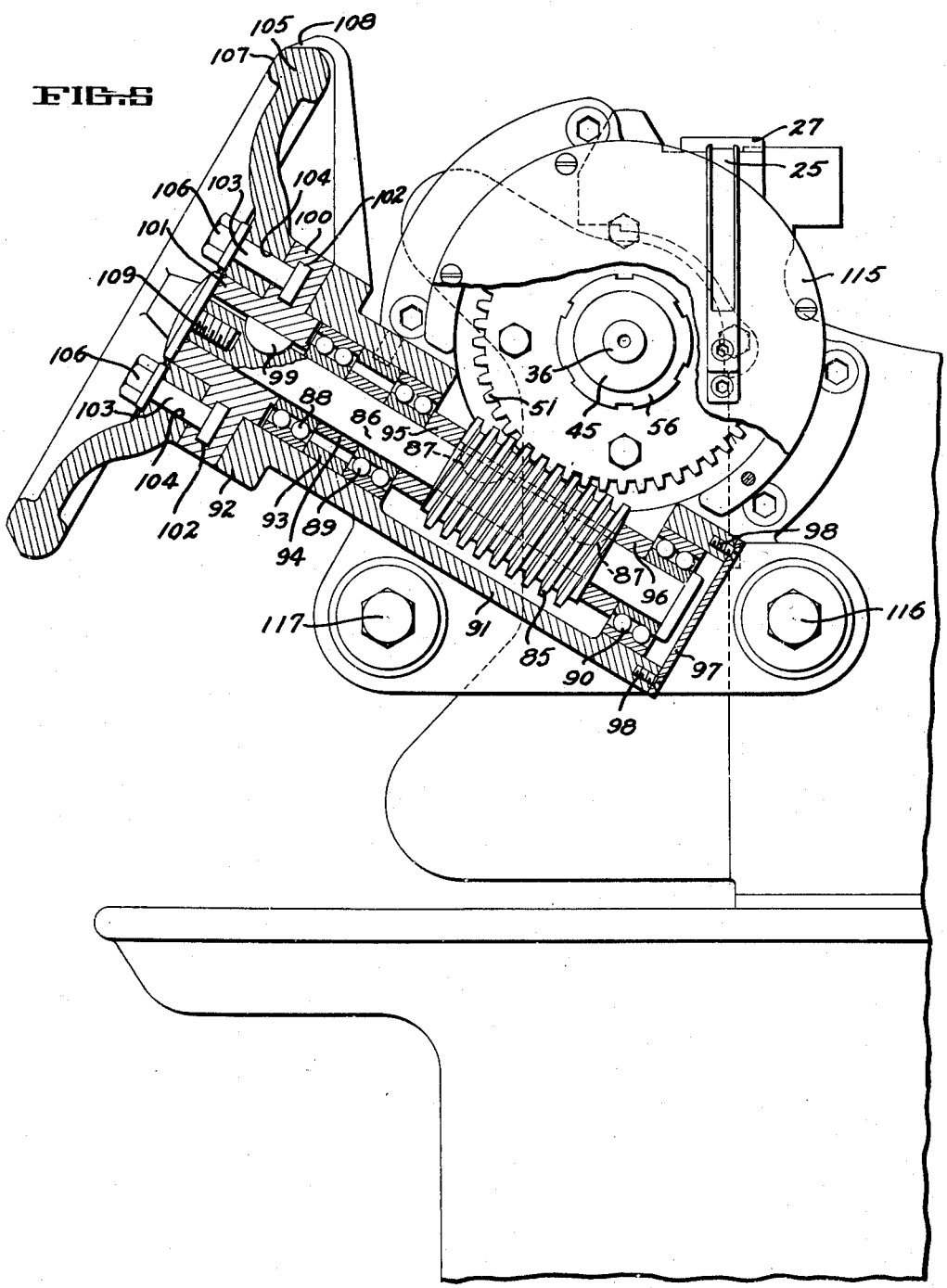

Patented Jan. 26, 1943

2,309,299

UNITED STATES PATENT OFFICE 2,309,299

METHOD OF AND APPARATUS FOR CORRECTING THE LEAD ERROR OF SCREW THREADS

Clifford A. Bickel, Sidney, Ohio, assignor to The Monarch Machine Tool Co., Sidney, Ohio, a corporation of Ohio Application November 18, 1940, Serial No. 366,099

11 Claims. (Cl. 82—5)

This invention relates to thread chasing, and in particular to means for correcting lead errors in thread chasing.

It is common knowledge that most lead screws in lathes, grinding machines and other machine tools vary more or less in lead throughout their length, and that although these variations may be relatively small, they will be translated to and appear increased in lead screws generated on such machines. Various devices have been designed to cope with this difficulty but the results have not been fully satisfactory since lead errors in thread chasing not only result from inaccuracies in the master lead screw but are due to many variable factors such as temperature variations, changes in the material to be chased and deflections caused by work stresses and strains between the work and the cutting tool and between the various moving and guiding parts.

It is an object of the invention to provide a lead error correcting device which is simple in operation and construction and easily attachable to a machine tool without impeding the work to be done on said machine tool.

Still another object consists in the provision of a lead error correcting device which will allow of every lead error being corrected while or before the finishing cut is made on the thread to be chased.

It is a still further object of the invention to provide a lead error correcting device which will be operable to move the lead screw of the machine tool on which the thread is chased in accordance with the lead errors appearing in said thread, for correcting said errors.

It is another object of the invention to provide a lead error correcting device as set forth in the preceding paragraph, in which the movement of the lead screw of the machine tool is translated to indicating means to enable control of the lead screw movement.

These and other objects and advantages of the invention will appear more clearly from the following specification in connection with the accompanying drawings, in which:

Figure 1 is an elevation of a portion of a lathe having attached thereto a lead error correcting device according to the invention.

Figure 2 is a top view of Figure 1.

Figure 3 is a longitudinal section through the lead error correcting device along the line 3—3 of Figure 2.

Figure 4 illustrates partially in section the gear box or drive end of the lead screw showing the means of compensating for the changes in length due to the advancing and retarding of the lead screw.

Figure 5 is a partial section along the line 5—5 of Figure 2.

General arrangement

According to the present invention the lead screw of the machine tool on which a thread is to be chased is associated with a shifting mechanism which is adapted to move the lead screw of the machine tool longitudinally selectively in one or the other direction by minute distances. The amount by which the lead screw is shifted is checked by an indicating mechanism connected to the machine tool.

After a rough cut on the screw to be chased on the machine tool has been made, the lead of the screw to be cut is tested by a testing device, for instance a nut or a thread feeler in cooperation with an indicating mechanism, to determine the differences between the actual lead on the screw to be chased and the lead it should have. These differences are marked down, while the locations where the said differences occur are noted. When this testing operation has been finished, the testing mechanism is disengaged from the thread to be chased and the finishing cut is made on the said thread, while whenever the cutting tool reaches a position on the thread where, as previously determined by the testing operation, the actual lead differs from the desired lead, the lead screw of the machine tool is shifted to the left or the right in accordance with the test data obtained by the testing operation. The cutting tool will then move in a path so as to perform a uniform accurate lead, thereby correcting the inaccuracies of the rough cut.

Structural arrangement

Referring to the drawings in detail, 10 is the bed of a lathe with a head stock 11, a tail stock 12 and a lead screw 13. Carried by the spindle in the head stock 11 is a chuck 14 which supports one end of a screw 15 to be cut, the other end of which is supported by the center 16 in the tail stock 12. However, if desired, the screw to be cut may of course be mounted between two centers. The tool 17 for chasing the thread is carried by a swivel 18 and the transverse slide 19, supported by the part 20 of the carriage 21, which may either be moved automatically or by rotation of the handwheel 22. 105 is a handwheel for effecting the longitudinal shifting movement of the lathe lead screw 13 which shifting movement may be checked by the indicating mechanism 24.

A tape reel (not shown) of the spring return type is associated with the end of the lathe and has mounted thereon a steel tape 25, one end of which is connected with the tape reel, while its other end is connected with the carriage 21 at the point 26. The tape is, in this way, held under suitable tension for correct reading and calibration. The tape 25 is passed through a sight member 27 which preferably magnifies the calibration on the tape so as to allow the most accurate reading.

Connected to the lathe bed 10 is the rear lead screw box 28 having a flange 29 integral therewith which supports the compensator housing 30. The lead screw 13 extends through the rear lead screw box 28 and the compensator housing 30 and is supported in the rear lead screw box 28 by a bearing 31. The bearing 31 is held in position by a snap ring 32 and a deflector bushing 33 connected in any convenient manner with the rear lead screw box 28, for instance, by a screw 34. The lead screw 13 is free to slide longitudinally in the bearing 31.

The lead screw 13 has extensions 35 and 36, of which the extension 35 has mounted thereon thrust bearings 37 and 38, while the extension 36 is provided with a thread 39. Mounted between the thrust bearing 37 and the shoulder 40 of the lead screw 13 is a disc 41. The thrust bearings 37 and 38 are spaced from each other by a compensating screw 42 and held in their position by the disc 41 engaging the shoulder 40 and the spacing collar 43 pressed against the thrust bearing 38 by means of the adjusting nut 44 and lock nut 45 threaded on the thread 39.

The compensating screw 42 is prevented from rotating by means of a key 46 engaging the head portion 47 of the compensating screw 42 and the rear lead screw box 28.

Meshing with the compensating screw 42 is a nut 48 keyed by means of a key 49 to the hub portion 50 of the worm wheel 51. The hub portion 50 may be connected with the worm wheel 51 in any convenient manner, for instance by screws 52. To prevent longitudinal movement between the hub portion 50 and the nut 48, the latter is connected to the hub portion 50 by means of a screw 53. The compensating screw 42 is furthermore engaged by a nut 54 spaced from the nut 48 and keyed by means of the key 55 to the hub portion 50. In contradistinction to the nut 48, however, the nut 54 is not rigidly connected to the hub portion 50. The nut 54 is held in its position by means of the threaded bushing 56 provided with a thread 57 which engages a corresponding thread 58. The bushing 56 may be adjusted relative to the hub portion 50 and when in desired position, maintained therein by tightening the set screw 59. The arrangement of the nut 54 and the bushing 56 is merely for preventing any play between the compensating screw 42 and the nut 48 when the latter is rotated by rotation of the worm wheel 51.

The gear hub portion 50 is rotatably mounted in the compensator housing 30 by means of anti-friction bearings 60 and 61, spaced from each other by sleeves 62 and 63. The sleeve 62 is connected to the compensator housing 30 by means of the screw 64, while the sleeve 63 is held in its position due to the fact that the inner race ring of the anti-friction bearing 61 abuts the shoulder 65 of the hub portion 50, whereas the inner race ring of the anti-friction bearing 60 is pressed against the sleeve 63 by means of the nut 66, held in its position by the set screw 67.

As will be clear from the above, turning movement of the worm wheel 51 will cause rotation of the nut 48 which, due to the fact that the key 46 prevents rotation of the compensating screw 42, will result in a longitudinal movement of the screw 42 and, thereby, of the lead screw 13, which is longitudinally movable in the bearing 37. The other end of the lead screw 13 (Figure 4) adjacent the head stock 11 of the lathe is rigidly connected to the bushing 68 by means of pin 69.

The bushing 68 has a splined portion 70, engaging a correspondingly splined member 71 connected by any convenient means, for instance a pin 72, with the stepped shaft 73. In this way relative movement between the lead screw 13 and the shaft 73 is made possible.

Pressed into the bore 74 of the splined bushing 68 is a bushing 75, preferably of bronze, bearing on the projection 76 of the stepped shaft 73. The stepped shaft 73 is journalled in anti-friction bearings 77 and 78 surrounded and spaced by the cylinder 79 which, by means of the flange 80, is connected to the gear box 81. The outer end of the cylinder 79 is closed by a cover 82. Keyed to the shaft 73, by means of key 83, is a gear 84 adapted to mesh with one of the gears in the gear box 81 for transmitting the drive thereof to the lead screw 13.

Meshing with the worm wheel 51 is a worm 85 (Figure 5) keyed to the worm shaft 86 by means of keys 87. The worm shaft 86 is journalled in anti-friction bearings 88, 89 and 90 housed in the worm housing 91 which is provided with a flange portion 92. The anti-friction bearings 88, 89 and 90 are positioned by the sleeves 93, 94 and collars 95 and 96. The worm housing 91 is closed at its lower end by a cover 97 connected thereto by means of screws 98.

Keyed to the worm shaft 86 by a key 99 is a collar 100 having a hub portion 101 integral therewith and being provided with an annular T-slot 102. The annular T-slot 102 is engaged by bolts 103 provided with a T-head and passing through bores 104 in the handwheel 105. By tightening the nuts 106, the handwheel 105 may be pressed against the collar 100. The handwheel 105 is preferably provided with a calibration 107 comprising two series of the same numbers, starting from zero to both sides thereof. Cooperating with the calibration 107 on the handwheel 105 is a pointer 108 rigidly connected to the worm housing 91. The handwheel 105 is tightened to the worm shaft 86 by means of screws 109.

As will be clear from the above, the arrangement of the T-slot bolts 103 makes it possible to circumferentially adjust the handwheel 105 with regard to the pointer 108 so as to set the zero calibration on the rim of the handwheel 105 in line with the pointer 108.

The calibrations on the handwheel 105 may be in any desired increments, for instance in one ten-thousandth of an inch and may, for example, register from zero plus or minus twenty-five ten-thousandths of an inch. The calibrations on the handwheel 105 are effective when the lead errors of the screw being chased are all negative or all positive. However, due to the back lash and stresses in all of the working parts from the compensating handwheel 105 to the cutting tool, the graduations are not effective when opposite errors, i. e., positive and negative errors are corrected during one and the same correcting operation. Therefore, in this instance, the indicating mechanism 24 is used.

As will be seen from Figure 3, the indicating mechanism 24 is provided with a contactor 110, which is engaged by a contacting screw 111 held by the lock nut 112 in the end of the lead screw 13. The indicating mechanism 24 is supported by a bracket 113, adjustably connected by means of a knurled thumb screw 114 with the cover 115 attached to the compensator housing 30 in any convenient manner. The contactor 110 is constantly urged into engagement with the screw 111 so that the shifting movement of the lead screw 13 in either direction will be translated to the indicating mechanism 24, thereby permitting an accurate shifting movement of the lead screw 13.

To secure proper meshing between the worm 85 and worm wheel 51, the worm housing 91 is pivotally connected to the compensator housing 30 by means of the stud 116 so that it can be shifted thereabout and then secured in its desired position by tightening the cap screw 117.

Operation

It may be supposed that the screw 15 has been rough chased to a desired degree so as to fit a gauging nut, a feeler, or any other convenient means, which is associated with the lead testing device. Such lead testing devices are well known to those skilled in the art and substantially comprise feeling means which feel the lead and, when moved through a lead, indicate by means of a pointer, the difference between the tested lead and the desired lead.

The lead testing device is now mounted on the carriage 21 and the free end of the tape 25 is also attached to the carriage 21. It may be assumed, for instance, that a screw with a pitch of 6mm. is to be chased, which means that the lead of the lead screw should be 6mm. per one revolution of the screw 15. If it is desired to check every four threads of the screw 15, the latter is now rotated by four complete revolutions. To be sure that the revolutions are complete and accurate, a 360 degree dial may be associated with the screw 15 and cooperate with a mark on the said screw. If the screw in the present instance has been rotated by four complete revolutions, the total lead should be 24mm. The testing device will then indicate the difference between the said 24mm. and the actual total lead on the screw 15 for the respective four revolutions thereof. This difference is marked down, while the tape 25 is provided with a mark to indicate the location of the point on the screw 15 at which the said difference is to be found. Thereupon the testing device is slightly moved to such a position that its indication corresponds to the desired pitch and now the screw 15 is again rotated by four complete revolutions and the testing operation repeated.

After the testing operation has been finished, the testing device is removed from the carriage 21 and the operator starts the correcting cut on the screw 15 which, if desired, may be the finishing cut. While this cut is being carried out, the handwheel 105 is adjusted whenever a point marked on the tape 25 is reached, so that the lead screw 13 is moved by a distance in correspondence to the error previously determined at the position corresponding to the marking on the tape.

If all errors are positive or negative, the handwheel 105 will be fully effective after the zero mark of its calibration has been brought into alignment with the pointer 108, as previously explained, in order to prevent any back lash or play between the handwheel 105 and the compensating screw 42. If alternately positive and negative errors are to be corrected, the handwheel 105 has to be adjusted in accordance with the indication on the indicator 24.

From the above it will be clear that according to the present invention the error in the pitch of the screw to be chased is directly checked and corrected on said screw in contrast to previous methods which locate and correct each factor separately which may cause a lead or pitch error.

It will be understood that I desire to comprehend within my invention such modifications as come within the scope of the claims and the invention.

Having thus fully described my invention what I claim as new and desire to secure by Letters Patent is:

1. In a machine tool, a lead screw operable for thread chasing, means for axially moving said lead screw, indicating means adapted automatically to indicate the magnitude of the longitudinal movement of said lead screw, and translating means interposed between said lead screw and said indicating means for translating the axial movement of said lead screw to said indicating means.

2. In a machine tool, a lead screw operable for thread chasing, means for axially moving said lead screw, indicating means adapted automatically to indicate the magnitude of the longitudinal movement of said lead screw, translating means interposed between said lead screw and said indicating means for translating the axial movement of said lead screw to said indicating means, and means for adjusting said translating means to vary the translating operation thereof.

3. In a machine tool, a lead screw operable for thread chasing, means for axially moving said lead screw, indicating means adapted automatically to indicate the magnitude of the longitudinal movement of said lead screw, a casing housing a portion of said lead screw, and means for adjusting the location of said indicating means relative to said casing.

4. In a machine tool, a lead screw operable for thread chasing, means for axially moving said lead screw, means for effecting a predetermined and variable axial movement of said lead screw, a carriage movable substantially parallel to said lead screw and adapted to support a cutting tool, and a calibrated reeled tape having one end thereof connected to said carriage.

5. In a machine tool, a lead screw operable for thread chasing, means for axially moving said lead screw, means for effecting a predetermined and variable axial movement of said lead screw, a carriage movable substantially parallel to said lead screw and adapted to support a cutting tool, optic means, and a calibrated reeled tape passing by said optic means and having one end connected to said carriage.

6. In a machine tool, a lead screw operable for thread chasing, a screw and nut arrangement operable for shifting said lead screw in axial direction, a pointer, and a calibrated handwheel for actuating said screw and nut arrangement, said handwheel and said pointer being movable relative to each other.

7. In a machine tool, a lead screw operable for thread chasing, a screw and nut arrangement operable for shifting said lead screw in axial direction, a stationary pointer, and a calibrated handwheel rotatable for actuating said screw and nut arrangement, said calibration on said handwheel being adjustable relative to said pointer.

8. In a machine tool, a lead screw operable for thread chasing, a nut and screw arrangement for axially shifting said screw in either direction, a worm wheel operatively connected with said nut and screw arrangement, a worm adapted to mesh with said worm wheel, means for operating said worm, and a casing housing said worm, said casing being pivotally mounted so as to vary the engagement of said worm with said worm wheel.

9. In a machine tool, a lead screw operable for thread chasing, means for rotating said lead screw, a carriage for supporting a thread chasing tool, means responsive to a rotation of said lead screw for moving said carriage in the direction of the longitudinal axis of said lead screw, a screw and nut arrangement adapted to effect axial movement of said lead screw together with said carriage as a unit in either direction independently of a rotation of said lead screw, means for preventing play between said screw and nut arrangement, and means for selectively actuating said screw and nut arrangement.

10. In a machine tool, a lead screw operable for thread chasing, anti-friction bearing means rotatably supporting one end of said lead screw, a screw arranged between said bearing means, two nuts spaced from each other and meshing with said screw, a worm wheel having a hub rigidly connected with one of said nuts, while the other nut is rotatably connected with but slidable relative to said hub, and means for actuating said worm wheel to axially move said lead screw together with said anti-friction bearings.

11. In a machine tool, a lead screw operable for thread chasing, splined means rigidly connected with one end of said lead screw, means slidably engaging said splined means for guiding the same, bearing means supporting the other end of said lead screw and adapted to allow axial movement thereof in said bearing means, and means for axially moving said lead screw in either direction by a predetermined distance.

CLIFFORD A. BICKEL.